US012650683B2

(12) United States Patent
Muehlpfordt et al.

(10) Patent No.: US 12,650,683 B2
(45) Date of Patent: Jun. 9, 2026

(54) SPRAY DRYING PLANT OPERATOR TRAINING SYSTEM

(71) Applicant: GEA Process Engineering A/S, Søborg (DK)

(72) Inventors: Michael Muehlpfordt, Ettlingen (DE); Andreas Frank, Ettlingen (DE); Marko Savic, Sarstedt (DE); Henrik Schwartzbach, Søborg (DK); Christian Hirschen, Düsseldorf (DE); Lars Voigt, Søborg (DK)

(73) Assignee: GEA Processing Engineering A/S, Søborg (DK)

( * ) Notice: Subject to any disclaimer, the term of this patent is extended or adjusted under 35 U.S.C. 154(b) by 1088 days.

(21) Appl. No.: 17/760,545

(22) PCT Filed: Sep. 18, 2020

(86) PCT No.: PCT/EP2020/076111
§ 371 (c)(1),
(2) Date: Mar. 15, 2022

(87) PCT Pub. No.: WO2021/053146
PCT Pub. Date: Mar. 25, 2021

(65) Prior Publication Data
US 2022/0357727 A1 Nov. 10, 2022

(30) Foreign Application Priority Data
Sep. 19, 2019 (EP) .................................... 19198346

(51) Int. Cl.
*G05B 19/418* (2006.01)
*G05B 19/05* (2006.01)

(52) U.S. Cl.
CPC ..... *G05B 19/41885* (2013.01); *G05B 19/054* (2013.01); *G05B 19/058* (2013.01)

(58) Field of Classification Search
CPC ............ G05B 19/41885; G05B 19/054; G05B 19/058; G05B 2219/35308; G05B 17/02; Y02P 90/02
See application file for complete search history.

(56) References Cited

U.S. PATENT DOCUMENTS

2008/0027704 A1 1/2008 Kephart et al.

FOREIGN PATENT DOCUMENTS

| CN | 107479510 A1 | 12/2017 |
| CN | 107896239 A | 4/2018 |
| DE | 103 53 051 A1 | 6/2005 |

OTHER PUBLICATIONS

Yang, S. H., L. Yang, and C. H. He. "Improve safety of industrial processes using dynamic operator training simulators." Process Safety and Environmental Protection 79.6 (2001): 329-338 (Year: 2001).*

(Continued)

*Primary Examiner* — Saif A Alhija
(74) *Attorney, Agent, or Firm* — Robinson & Cole LLP

(57) ABSTRACT

A method for training an operator of a spray drying plant, the spray drying plant including a plurality of plant elements including pre-processing elements, a spray drying element, post-processing elements, powder recovery elements, and a programmable logic controller, PLC. The method including the steps of: obtaining a transient model of the spray drying plant, wherein the transient model includes transient sub-models of the plurality of plant elements; calculating repeatedly simulated sensor data based on the obtained transient model, using a processing unit; displaying on a display a training human machine interface, tHMI, configured to communicate with the transient model of the spray drying plant, and to display the simulated sensor data and control data for the transient model; and updating the transient (Continued)

model based on operator input on the tHMI, for controlling the transient model of the spray drying plant.

13 Claims, 5 Drawing Sheets

(56)                 References Cited

OTHER PUBLICATIONS

Wawrzyniak, Pawel, et al. "Model of heat and mass transfer in an industrial counter-current spray-drying tower." Drying technology 30.11-12 (2012): 1274-1282. (Year: 2012).*

Birchal, V. S., et al. "Spray dryers: modeling and simulation." Drying Technology 24.3 (2006): 359-371. (Year: 2006).*

Oakley, David E. "Spray dryer modeling in theory and practice." Drying Technology 22.6 (2004): 1371-1402. (Year: 2004).*

Zbicinski, Ireneusz. "Modeling and scaling up of industrial spray dryers: A review." Journal of Chemical engineering of Japan 50.10 ( 2017): 757-767. (Year: 2017).*

International Search Report issued on corresponding PCT Application No. PCT/EP2020/07611, dated Dec. 16, 2020, pp. 1-2.

Yang et al. "Improve Safety of Industrial Processes Using Dynamic Operator Training Simulators," Process Safety and Environmental Protection, Institution of Chemical Engineers, Rugby, GB, vol. 79, No. 6, Nov. 1, 2001, pp. 329-338.

* cited by examiner

SPRAY DRYING PLANT OPERATOR TRAINING SYSTEM

CROSS REFERENCE TO RELATED APPLICATION

The instant application is a U.S. National Stage application of PCT/EP2020/076111, filed on Sep. 18, 2020, which is a PCT Application of and claims priority to EP Application No. 19198346.9, filed on Sep. 19, 2019, the subject matter of these applications are hereby incorporated by reference in their entireties.

FIELD OF THE INVENTION

The invention relates to a spray drying plant operator training method and corresponding system.

BACKGROUND

Spray drying plants are widely used in the field of food, dairy, feed, ingredients, chemical processing, and pharmaceuticals. Spray drying is a method of producing a dry powder from a liquid or slurry by rapidly drying it with a hot or cold gas. In order to be as effective as possible the spray drying plants are often run without interruptions. Many plant elements are included in standard spray drying plants, which result in fairly complex plant constructions. Spray drying plants consist of many components which can be combined in several ways to make the optimal drying process for the specific product to be dried. The components in a spray drying plant may include: pre-processing elements (including heating, concentration, mixing, homogenization, evaporation) for pre-processing of the liquid feed, a spray dryer (including air dispersers, atomizers, heaters, drying chamber, internal fluid bed, fines return etc.), post processing elements (including fluid beds, mixers, grinders, rewetting, agglomeration) for post processing of the dry or semidry powder, and powder recovery elements (bag filters, cyclones and combinations hereof).

In order to ensure that the plant is running as it should, an operator usually supervises the spray drying process from a workstation, while it is running. To make this possible, the spray drying plants are usually equipped with a plurality of sensors that measure different parameters on the different plant elements, as well as a plurality of active elements that can control the different parameters. These sensors and active elements are then connected to a programmable logic controller, PLC, which then communicates with the workstation having a supervisory control and data acquisition system, SCADA, and human machine interface, HMI, displaying the data from the sensors and the active elements. This makes it possible for the plant operator to have an overview of the plant and if a parameter is outside a threshold range or if one or more of the plant elements fail, the operator can get an alarm or a visual notification on the HMI such that an action can be taken to rectify the error or stop the spray drying process.

Even if the plant operator in many cases can rectify the failure on the plant, in some situations the operators either react too slowly or are not prepared for the failure situation that is happening. This is often because the operators and even the most experienced ones, are not confronted in their daily operation to some rare failure scenarios that can be critical for the plant. Some failures can cause irreversible damages to the spray drying plant and expensive machines of the plant can be broken. These broken plant elements must then be replaced or repaired which in itself is expensive, but the plant may also suffer from a long downtime. This can be critical for the suppliers and the distributors that are depending on the functioning of the spray drying plant.

For example, in the field of spray drying of milk, the milk suppliers may not be able to unload their trucks full of milk because of the downtime. It takes time to train operators for specific drying plants, and the high degree of automation results in a lack of hands-on experience of the different fail scenarios. It can take up too many years before an operator masters the complex control systems and requires a lot of supervision from a more experienced operator. Another problem is that many operators suffer from a lack of confidence when confronted to an actual issue on a running plant. Since many plants as described above cannot be stopped from running for training purposes, some operators never face the fail scenarios before they actually happen.

SUMMARY

It is therefore an object of the invention to provide a method for training an operator of a spray drying plant for overcoming one or more of the above problems.

According to a first aspect of the present invention, these and further objects may be achieved by a method for training an operator of a spray drying plant, the spray drying plant comprising a plurality of plant elements including pre-processing elements, a spray drying element, post-processing elements, powder recovery elements, a programmable logic controller, PLC, a plurality of sensors, and a plurality of active elements, wherein the plurality of sensors are configured to measure process variables on the plurality of plant elements and to send sensor signals to the PLC, and wherein the plurality of active elements are configured to control process variables of one or more of the plurality of plant elements in response to control signals received from the PLC, the spray drying plant further comprising an operation human machine interface, oHMI, configured to communicate with the PLC and to display a plurality of sensor data based on the obtained sensor signals from the plurality of sensors;

the method the steps of:

obtaining a transient model of the spray drying plant, wherein the transient model comprises transient sub-models of the plurality of plant elements;

calculating repeatedly simulated sensor data based on the obtained transient model, using a processing unit;

displaying on a display a training human machine interface, tHMI, configured to communicate with the transient model of the spray drying plant, and to display the simulated sensor data and control data for the transient model;

updating the transient model based on operator input on the tHMI, for controlling the transient model of the spray drying plant.

By having a method according to the first aspect of the invention a realistic simulation model of a spray drying plant may be achieved. With the training method of above a plant operator would be trained on a simulation of a plant that is substantially identical with the plant that the operator would work on. The operators that are trained on such a simulation tHMI may thereby be prepared for a situation that is substantially the same failure scenario as in the real situation. This may result in an improved training of plant operators. The tHMI may both be used to train newly employed operators, operators that are new to a plant, and experienced operators that have to be kept updated e.g. on a given spray drying plant, on some failure procedures, or on maintenance procedures. Even if an operator is experienced and have tried many different failure scenarios through the daily work, the operator should still be able to react in a fast manner to e.g. failure scenarios in order to avoid damages on the plant. Some failure scenarios may be very rare, and an operator, even if experienced, may have been subject to such a scenario only a few times during his daily work, or even in some cases never. The operators may therefore get a proactive and regular training, instead of training sessions where the operator is away to e.g. a dedicated training plant for several days e.g. to a training course.

A further advantage of the above method is that the method is flexible to changes in the spray drying plant, such as the exchange, removal, or introduction of new plant elements. The operators to be trained may therefore be trained on a tHMI that is substantially up to date with respect to the actual plant.

An example of a spray drying process is the spray drying of milk for making powdered milk. The milk is first pre-processed for roughly removing the water content of the milk liquid e.g. with one or more centrifugal pump, an evaporator, and a homogenizer. Then the concentrated milk is spray dried by being pumped into a spray drying chamber, where it is sprayed out through atomizers such as high-pressure nozzles at the same time as a continuous stream of warm drying air is pumped into the chamber. This removes most of the water content from the drops of milk. As it is in most cases it is not possible to prevent the drying air from capturing a minor part of the dry matter content, the air undergoes a post-processing procedure e.g. through a cyclone and bag-filter. The collected dry matter is then later returned to the process. Nevertheless, the majority of the dry matter content from the milk falls to the bottom of the chamber as powdered milk. The powder is not left lying on the bottom of the chamber, as the bottom is a gill-slit cover such as a fluid bed. Air is blown across this in such a way that the air and powder mix behaves in the same way as a fluid. This is commonly known in the field of spray drying as "fluidizing". Fluidizing facilitates conveying the powder to one or more drying chambers, where the water content can be reduced even further.

The spray drying plant comprises a plurality of plant elements which includes pre-processing elements, spray drying elements, post-processing elements, powder recovery elements, a programmable logic controller, PLC, a plurality of sensors, and a plurality of active elements. The pre-processing elements may be e.g. a heating element, a concentrator element, a mixer element, a homogenization element, or an evaporator. The pre-processing elements are there to prepare the liquid to be spray dried before it is spray dried. It is preferable to reduce the content of e.g. water in the liquid to be spray dried such that the dry matter content of the liquid is around 50% before starting the spray drying process. This is because the spray drying process is more effective when the dry-content percentage is higher and it is also cheaper to pre-process the liquid to be spray dried instead of removing the water only by spray drying. After the pre-processing of the liquid, it is directed to the spray drying elements which may e.g. comprise one or more spray drying chambers and one or more atomizers such as high-pressure nozzles. The spray drying chamber may generally be a large vessel made of stainless steel, where air is blown at the top of it and where the liquid product to be processed in fed into the chamber and sprayed into small droplets with high-pressure nozzles comprised in the spray drying chamber.

The PLC is operatively connected to one or more of the plurality of sensors and active elements. The PLC may be located at the spray drying plant or may alternatively be located remotely from the plant and in communication with the plurality of sensors and active elements. This may be through an input/output (I/O) interface located at the spray drying plant. The PLC disclosed comprises a computer and may be any unit which comprises a unit able to perform basic arithmetic, such as a central processing unit (CPU). The PLC may comprise one or more drivers for communicating with the plurality of sensors and active elements. It may further include comprise digital I/O interfaces and analog I/O interfaces. The PLC may be pre-programmed to perform logic operations such as obtaining sensor signals and active elements signals, to send control signals to the sensors and active elements. The PLC is operatively connected with the oHMI. This connection may be a direct wired connection e.g. if the oHMI is located at the spray drying plant, but may alternatively also be connected through a network such as the internet, a cloud, or the like.

The sensors are positioned on one or more of the plant elements to measure process variables on the plurality of plant elements. The sensors are e.g. humidity sensors i.e. hygrometers, temperature sensors, flow sensors, and pressure sensors, measuring process variables such as the humidity, the temperature, the flow, and the pressure respectively. The active elements may be comprised in one or more of the plant elements for controlling said plant elements or be a plant element itself. The active elements may be configured to perform an activity or actuate a device. The active elements may e.g. be a valve in a plant element such as a pump, a switch to switch between plant elements such as switching from a running pump to a redundancy pump e.g. in case of failure of the running pump, or any other element for controlling the process variables. The process variables may in some cases require the control of more than one active element. For example, to control the output of powder from a spray drying plant many process variables may have to be changed. This may e.g. be the input of milk, the pressure of the atomizer, the temperature in the spray drying chamber etc. The active elements may receive control signals from the PLC which then may control the said active elements. The control signals may be pre-programmed in the PLC or may also be send from the oHMI, received at PLC, and then generated at the PLC.

The oHMI may generally be understood as a user interface or dashboard that allows a user or operator to interact with a machine, system, or device. A HMI may alternatively also be called a man-machine interface, MMI, an operator interface terminal, OIT, a local operator interface, LOI, or an operator terminal, OT. The oHMI may also comprise a graphical user interface, GUI, for e.g. the visualization of different elements of the spray drying plant.

The oHMI may be displayed on a computer in a control room at the spray drying plant. The oHMI may be comprised in a SCADA system installed on the workstation in the control room of the spray drying plant. The SCADA system may acquire the sensor data and the control data from the PLC.

The transient model may be stored in a cloud, database etc, at the spray drying plant or remotely from the spray drying plant. The transient model comprises sub-models of the plurality of plant element. The sub-models depend on each other i.e. the plant elements are related to each other in the models. The output of one sub-model may thereby be the input of another sub-model and the sum of the one or more sub-models define the transient model. For example, the sub-model for the spray drying chamber may be modelled based on specific inputs and outputs. The inputs may be the air in-going into the spray drying chamber, e.g. the mass flow, the temperature, the vapor fraction, the product in-going, e.g. the mass flow of product, the temperature of the product, or the solids fractions in the product. The outputs from the spray drying chamber may be the powder coming out from the drying chamber and parameters related to the powder such as the mass flow, the water fraction, and the temperature of it, the air outgoing from the spray drying chamber and parameters related to the air, such as the pressure, the temperature, the vapor fraction, and the solids fraction.

One or more parameters may be modelled in the transient model and the transient sub-models. For the spray drying chamber the following parameters may e.g. be modelled: the volume, the heat loss through the surface area, the thickness of the walls, the heat capacity of the walls, the heat transfer coefficient from air to walls, the powder technology related specific constants such as the time delay, the heat transfer coefficient, the evaporation efficiency, and the fraction of fine particles. These inputs and outputs and related parameters may be defined in the sub-models by physical models. Some examples are e.g. the mass balance by integration of ingoing flows minus outgoing flows for both air, solids, and water, the calculation of air pressure, the calculation of the mass flow of powder, the water fraction in the powder, the vapor fraction and the solids fraction in the spray dryer, the thermal balance in the spray drying chamber by modelling the heat loss through the walls, the temperature of the walls, the temperature of the air, and the temperature of the powder. The type of product being processed in the spray drying may have an influence on the transient sub-models. Depending on the type of product being processed, the physical properties of the product may vary. The product generally consists of a mixture of substances, where every substance has specific properties, such as heat capacity and density. The product may generally be a mixture of water and solids, which may be described by a product mass flow and a fraction of solids in the product. The type of product being processed may therefore have an influence on the transient sub-models.

The control signals may result from an input from an operator on the oHMI such as to change a process variable of one or more of the plant elements. The control signals may be sent to the plurality of active elements. The sensor data may be the measured process variables by the plurality of sensors.

Simulated sensor data is calculated repeatedly i.e. continuously in order to update the tHMI with the most recently calculated simulated sensor data.

The simulated sensor data may also be calculated based on the control data i.e. the input from an operator. The operator may thereby get the direct consequence or response of the control data that has been inputted into the tHMI.

The tHMI is operatively connected to the processing unit and displays a plurality of simulated sensor data and control data based on the obtained transient model. The tHMI may generally be understood as a user interface or dashboard that allows a user or operator to interact with a machine, system, or device. The tHMI may also comprise a graphical user interface, GUI, for e.g. the visualization of different elements of the spray drying plant. The tHMI and oHMI may be on separate workstations and therefore displayed on separate displays. The oHMI may e.g. be displayed on a workstation in a control room at the spray drying plant. The oHMI may be comprised in a SCADA system installed on the workstation in the control room of the spray drying plant. The SCADA system may acquire the sensor data and the control data from the PLC. The tHMI may be displayed on a display of a workstation in a control room at the spray drying plant but may also be displayed on a display of a workstation in a separate training room. The processing unit may be comprised in a common workstation for the oHMI and the tHMI and update the transient model which is stored at the common workstation. Alternatively, the processing unit may be comprised in the workstation for the tHMI only and update the transient model on the workstation. Alternatively, a separate processing unit may be comprised e.g. remotely on a server and may update the transient model on the server and communicate with the workstation. In a further alternative a separate processing unit may be comprised e.g. remotely on a server and may update the transient model which is stored at the workstation of the tHMI and communicate with the workstation.

In some embodiments, the transient sub-model for the spray drying chamber is based on one or more inputs and one or more outputs, where the one or more inputs and one or more outputs comprise one or more of the following: the mass flow, the temperature, and the vapor fraction of the air going into the spray drying chamber, or the mass flow, the temperature, and the solids fractions in a product to be dried.

In some embodiments, the transient sub-model for the spray drying chamber comprises the modelling of at least one of the following: the volume of the spray drying chamber, the heat loss through the surface area of the spray drying chamber, the thickness of the walls of the spray drying chamber, the heat capacity of the walls of the spray drying chamber, the heat transfer coefficient from air to walls, the heat transfer coefficient of the product to be spray dried, the evaporation efficiency of the product to be spray dried, and the fraction of fine particles of the product to be spray dried.

In some embodiments, at least a portion of the tHMI visual layout is identical to the oHMI. The visual layout of the tHMI may be substantially identical to the visual layout of the oHMI. This may be advantageous when an operator has been trained on the tHMI, so that when the operator returns to the actual spray drying plant and the oHMI, the operator is capable of recognizing the visual layout of the oHMI. This may allow the operator to react faster to a failure situation. The operator would also know how the oHMI would react visually when performing actions on the oHMI.

In some embodiments, the spray drying plant further comprises an operator control room having a workstation with a display, the workstation having an operation mode and a training mode, wherein the workstation is configured to display on the display the oHMI in the operation mode and the tHMI in the training mode. The workstation may comprise a computer with a monitor, a mouse, and a keyboard such that the operator can control the oHMI and the tHMI. The workstation may comprise one computer for each of the oHMI and the tHMI such that the oHMI is displayed on one display and the tHMI on another display, or the oHMI and the tHMI may be displayed on a common display. The oHMI and the tHMI may be located in separate operator control rooms at the spray drying plant or remotely from the spray drying plant. The operation mode may e.g. be displayed on a computer in an operator control room at the spray drying plant, whereas the training mode may be displayed on a computer in a separate operator control room which may be located away from the spray drying plant. The operation mode may be understood as a mode where the oHMI is displayed on the display of a workstation, allowing an operator at the workstation to monitor, supervise, and control the actual spray drying plant through the oHMI. The training mode may be understood as a mode where the tHMI is displayed on the display of a workstation, allowing an operator to be trained.

In some embodiments, when the workstation is in the training mode, a control unit repeatedly evaluates whether the spray drying plant is in a steady state, and if said control unit determines that the steady state conditions are not fulfilled the control unit performs an action to switch the workstation from the training mode to the operation mode.

When the tHMI and the oHMI are running in a common control room or on a common workstation, an operator may thereby combine the supervision of the actual spray drying plant and the training on the simulated spray drying plant.

This allows for an operator at the workstation to be trained on the tHMI in the training mode, when the spray drying plant can run substantially without supervision from the operator. The operator to be trained may therefore optimize the time spent supervising the plant, since he can focus on training e.g. on fail scenarios and maintenance procedures instead of waiting for an alarm from the SCADA system. The control unit determines whether the spray drying plant is in a steady state based on steady state conditions that have to be fulfilled. The steady state conditions may be defined as threshold values for one or more parameters that should not be exceeded. These threshold values may be substantially similar to the threshold values defined in the SCADA system triggering alarms sent out to the oHMI and the operator supervising the spray drying plant. The control unit is operatively coupled to the PLC, the workstation, and may be operatively coupled to the processing unit.

In some embodiments, the processing unit is configured to set initial condition for the transient model based on sensor data received from the spray drying plant.

The processing unit may obtain obtained sensor data of the spray drying plant from the PLC. This may allow to update the transient model with real sensor data from the spray drying plant and thereby render the inputs and outputs of the transient sub-models more realistic. This also allows e.g. when switching from the operation mode to the training mode, to update the transient model such that substantially the same values are displayed on the tHMI than the oHMI. Thereby the operator to be trained may not notice when the display has changed from the oHMI to the tHMI. An advantage of this, may be that the method according the invention may allow to train the operator be switching from the oHMI to the tHMI on the workstation without the operator noticing. Then, a fail scenario may e.g. be loaded and started such that the operator to be trained is tricked to think that the fail scenario is real.

In some embodiments, the method further comprises the steps of:

provising the processing unit with a pre-programmed fail scenario;

modifying the transient model based on the pre-programmed fail scenario using the processing unit.

The pre-programmed fail scenario may be understood as a failure scenario that has been pre-programmed to train an operator of a spray drying plant on known failure scenarios that are happening on the spray drying plant. The pre-programmed fail scenarios may be faulty or erroneous sensor data that is generated by the processing unit, where the faulty sensor data is displayed such that one or more of the plant elements appear faulty on the tHMI, whereby fail training scenarios are generated. The tHMI may then be configured to receive a user input for correcting the faulty sensor data. The pre-programmed fail scenario may comprise a set of parameters and/or pre-sets values or states that make the spray drying plant fail or malfunction. The parameters and/or pre-sets values are e.g. parameters outside a threshold range such as a too low or too high temperature of the air inside the spray drying chamber. The states are e.g. a pump that is in an out of order state or a nozzle of the spray drying chamber that is clogged. When the processing unit is provided with a pre-programmed scenario, the transient model is modified based on the content of the pre-programmed fail scenario. This may e.g. be as stated above, a set of parameters and/or pre-sets values that may change one or more inputs or outputs of the transient model and one or more parameters of the transient model. These changes and faulty sensor data may result in errors and failures that are triggered and coming up on the displayed tHMI, e.g. as visual signals of one or more plant elements that appear faulty on the tHMI. These errors and failures may then be handled by the operator to be trained. The operator may then handle the fail scenario by performing user actions on the tHMI in order to rectify the fail scenario and make the modelled plant to run as it should again. These actions performed by the operator e.g. through the working station on the tHMI may then be recorded by the processing unit. This may e.g. be the recording of the clicks performed by the operator on the workstation and how fast the fail scenario has been alleviated. The pre-programmed fail scenarios may be stored in a database, where the processing unit may obtain the pre-programmed fail scenarios.

In some embodiments, the method further comprises the steps of:

providing the processing unit with best practice criteria related to a first pre-programmed scenario;

evaluating using the processing unit a performance of the operator based on the best practice criteria.

In order to evaluate the performance of the operator training on the tHMI when trying to solve a given fail scenario, the actions performed by the operator have to be compared with best practice criteria for the fail scenario. The best practice criteria may e.g. comprise a time variable such that the fail scenario should be solved within a given time interval in order not to cause irreversible damages on the spray drying plant in a real life fail scenario. A fail scenario may be solved in different ways by an operator, and there may therefore be combinations to solve the fail scenarios that are better than others. This can also be weighted in the evaluation of the performance. The evaluation may be an automatic evaluation based on the criteria for best practice by comparing the result of the operator training with the criteria. The output of the evaluation may be a score result, such that the results of different operators can be compared and the evolution of an operator can be tracked by seeing e.g. an improvement in the score results. The processing unit may also select randomly which fail scenario the operator to be trained should face during a training. There may be 5, 10, 15, 20, or 50 different fail scenarios to choose from. The recording of the user input may be started immediately after the transient model has been modified.

In some embodiments, the transient model is configured to communicate with a transient model human machine interface, tmHMI, where the tmHMI is configured to control the transient model by defining initial condition for the transient model and/or activating a particular pre-programmed fail scenario of a plurality of pre-programmed fail scenarios. The tmHMI may be displayed on a separate display allowing a trainer to activate a pre-programmed fail scenario for a trainee. However, the tmHMI may also be displayed on the same display displaying the tHMI allowing the operator being trained to select a pre-programmed fail scenario.

In some embodiments, the method further comprises the steps of displaying an operator interface allowing the operator to input auxiliary operator action.

The operator interface allows the operator to perform an auxiliary operator action. When an operator is performing a training on the tHMI of the workstation, the operator may not always be able to solve a fail scenario by performing actions on the tHMI alone. Some real life fail scenarios may only be solved by taking action directly on the spray drying plant, and it would not be possible for an operator to solve the real life fail scenario by only performing actions on the oHMI of the spray drying plant as only a limited amount of actions may be performed from the oHMI. This may in a real life scenario be done by sending a person to the plant to solve the fail scenario, such as a plant technician or engineer, an electrician, a plumber, a fire worker etc. depending on the fail scenario. This may for training purposes be simulated in the tHMI by generating or emulating the operator interface allowing e.g. to perform an auxiliary operator action such as calling a plant technician, an electrician, a plumber, a fireworker, or a supervisor of the spray drying plant. The auxiliary operator actions that the operator can perform may be simulated in the form of buttons that the operator can press with the mouse of the workstation such that the actions performed by the operator can be tracked, recorded, and evaluated. The operator may e.g. click on a button for simulating the action of calling a plant technician and then confirming by clicking a button for performing the auxiliary operator action. The operator interface may thereby prepare an operator for a real-life scenario where the operator being trained is confronted with a situation where an auxiliary operator action needs to be taken. A trained operator may thereby be prepared and react in a faster manner when being confronted to such a situation. The operator interface may be generated and displayed directly, e.g. if the loaded fail scenario only can be solved by the intervention of technician or the like. The operator interface may be displayed on the same display that displays the tHMI. However, the operator interface may also be displayed on another display.

In some embodiments, the transient model is further updated based on operator input on the operator interface.

Consequently, the effect of performing the auxiliary operator actions may be simulated. This allow the operator to simulate replacing a failing plant element and/or performing maintenance on a failing plant element. This will allow the training to be extended beyond normal operation. This may further be used to evaluate the effect of performing a maintenance and/or replacement operation.

In some embodiments, the transient sub-models of the plurality of plant elements comprises a first transient sub-model, modelling a first plant element in a first state and wherein the step of updating the transient model based on operator input on the operator interface comprises substituting the first transient sub-model with a second transient sub-model modelling the first plant element in a second state.

Consequently, the auxiliary action may be simulated. As an example, if the auxiliary action comprises calling a technician to perform maintenance on a plant element, the first state may simulate the plant element before maintenance has been performed and the second state may simulate the plant element after maintenance has been performed.

In some embodiments, the operator interface is configured to allow an operator to indicate a plant element of the plurality of plant elements and an auxiliary action.

Consequently, a more realistic training is provided. As an example, an operator may be trained in identifying a specific failing plant element based on the information provided in the tHMI.

In some embodiments, the method further comprises the steps of:

providing the processing unit with a pre-programmed fail scenario, simulating failure of a plant element of the plurality of plant elements;

providing the processing unit with best practice criteria related to the pre-programmed fail scenario;

modifying the transient model based of the pre-programmed fail scenario by substituting a transient sub-model modelling the plant element that is to be failing with another transient sub-model simulating the failure;

evaluating using the processing unit a performance of the operator based on the best practice criteria, wherein the best practice criteria include specific one or more auxiliary operator actions to be performed by the operator using the operator interface.

Consequently, the operator may be trained and evaluated in complex situations.

In some embodiments, the specific one or more auxiliary actions simulate a maintenance operation or a substitution operation on the failing plant element.

Here and in the following, the term 'processing unit' is intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special-purpose electronic circuits, etc., or a combination thereof.

BRIEF DESCRIPTION OF THE DRAWINGS

The above and/or additional objects, features and advantages of the present invention will be further elucidated by the following illustrative and non-limiting detailed description of embodiments of the present invention, with reference to the appended drawings, wherein.

DETAILED DESCRIPTION

In the following description reference is made to the accompanying figures, which show by way of illustration how the invention may be practiced.

Figure 1:
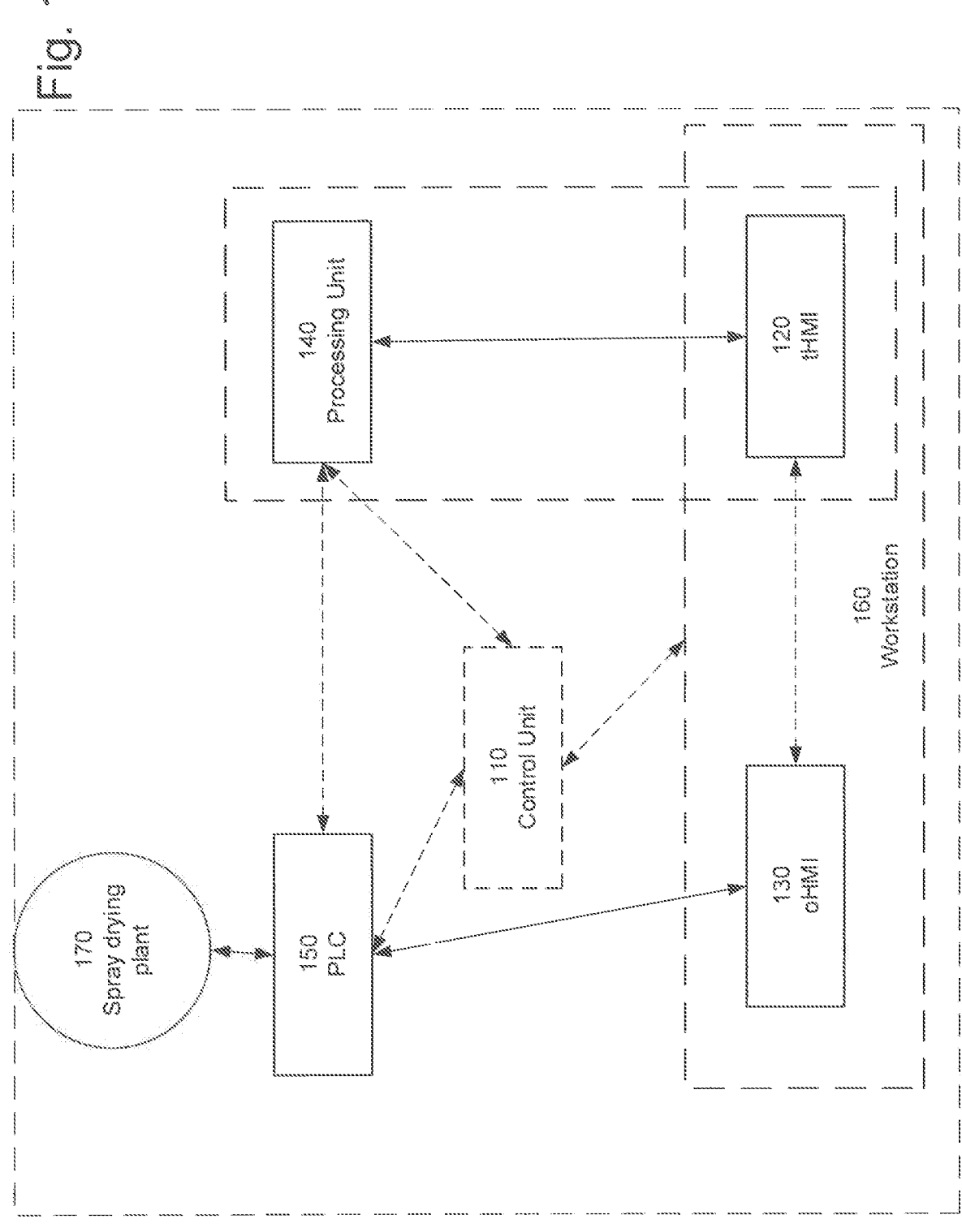
FIG. 1 shows a block diagram representing an example of a method for training an operator of a spray drying plant, according to an embodiment of the invention.

FIG. 1 shows a block diagram representing an example of a method for training an operator of a spray drying plant, according to an embodiment of the invention, where the spray drying 170 plant comprises a plurality of plant elements including pre-processing elements, a spray drying element, post-processing elements, powder recovery elements, a programmable logic controller 150, PLC, a plurality of sensors, and a plurality of active elements, wherein the plurality of sensors are configured to measure process variables on the plurality of plant elements and to send sensor signals to the PLC 150, and wherein the plurality of active elements are configured to control process variables of one or more of the plurality of plant elements in response to control signals received from the PLC 150, the spray drying plant 170 further comprising an operation human machine interface 130, oHMI, configured to communicate with the PLC 150 and to display a plurality of sensor data based on the obtained sensor data from the plurality of sensors. The method further comprises the steps to obtaining a transient model of the spray drying plant 170, wherein the transient model comprises transient sub-models of the plurality of plant elements; calculating repeatedly simulated sensor data based on the obtained transient model, using a processing unit 140; displaying on a display a training human machine interface 120, tHMI, configured to communicate with the transient model of the spray drying plant 170, and to display the simulated sensor data and control data for the transient model; updating the transient model based on operator input on the tHMI 120, for controlling the transient model of the spray drying plant 170.

The PLC 150 is operatively connected to the spray drying plant 170 and thereby to one or more of the plurality of sensors and active elements. The PLC 150 may be located at the spray drying plant 170 or may alternatively be located remotely from the spray drying plant 170 and in communication with the plurality of sensors and active elements. The PLC 150 is operatively connected to the oHMI 130. The spray drying plant 170 may receive control signals from the PLC which then may control one or more of the elements of the spray drying plant 170. The control signals may be pre-programmed in the PLC or may also be send from the oHMI, received at PLC, and then generated at the PLC.

The oHMI 130 may be comprised in a SCADA system installed on the workstation 160 in the control room of the spray drying plant 170. The SCADA system may acquire the sensor data and the control data from the PLC.

The processing unit 140 repeatedly i.e. continuously calculates simulated sensor data 140 in order to update the tHMI 120 with the most recently calculated simulated sensor data.

The tHMI 120 is operatively connected to the processing unit 140 and displays a plurality of simulated sensor data and control data based on the obtained transient model.

In an alternative embodiment the tHMI 120 may be operatively connected to the PLC 150. The tHMI 120 and oHMI 130 may be on separate workstations 160 and therefore displayed on separate displays. The oHMI 130 may e.g. be displayed on a workstation 160 in a control room at the spray drying plant 170.

The tHMI 120 may also be displayed on a display of a workstation 160 in a control room at the spray drying plant 170 but may also be displayed on a display of a separate workstation in a separate training room. The processing unit 140 may be comprised in a common workstation 160 for the oHMI 130 and the tHMI 120 and update the transient model which is stored at the common workstation 160. Alternatively, a separate processing unit 140 may be comprised e.g. remotely on a server and may update the transient model on the server and communicate with the workstation 160.

In an alternative embodiment, a control unit 110 is operatively coupled to the PLC 150, the workstation 160, and the processing unit 140. When the workstation 160 is in the training mode, the control unit 110 repeatedly evaluates whether the spray drying plant 170 is in a steady state, and if said control unit 110 determines that the steady state conditions are not fulfilled the control unit 110 performs an action to switch the workstation 160 from the training mode to the operation mode.

Figure 2:
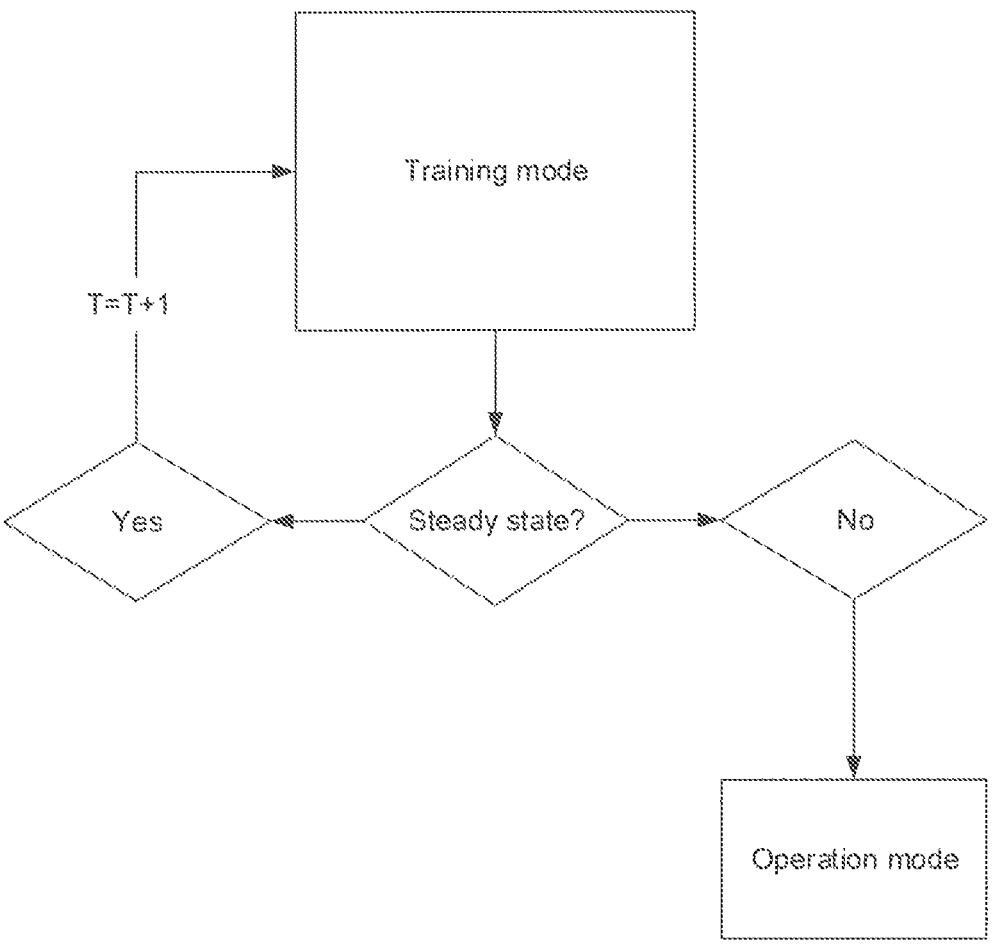
FIG. 2 shows a flow chart of a method for training an operator of a spray drying plant.

FIG. 2 shows a flow chart of a method for training an operator of a spray drying plant by having a control unit for switching between a training mode and an operation mode. When the workstation is in the training mode, a control unit repeatedly evaluates whether the spray drying plant is in a steady state, and if said control unit determines that the steady state conditions are not fulfilled the control unit performs an action to switch the workstation from the training mode to the operation mode. When the tHMI and the oHMI are running in a common control room or on a common workstation, an operator may thereby combine the supervision of the actual spray drying plant and the training on the simulated spray drying plant.

Figure 3:
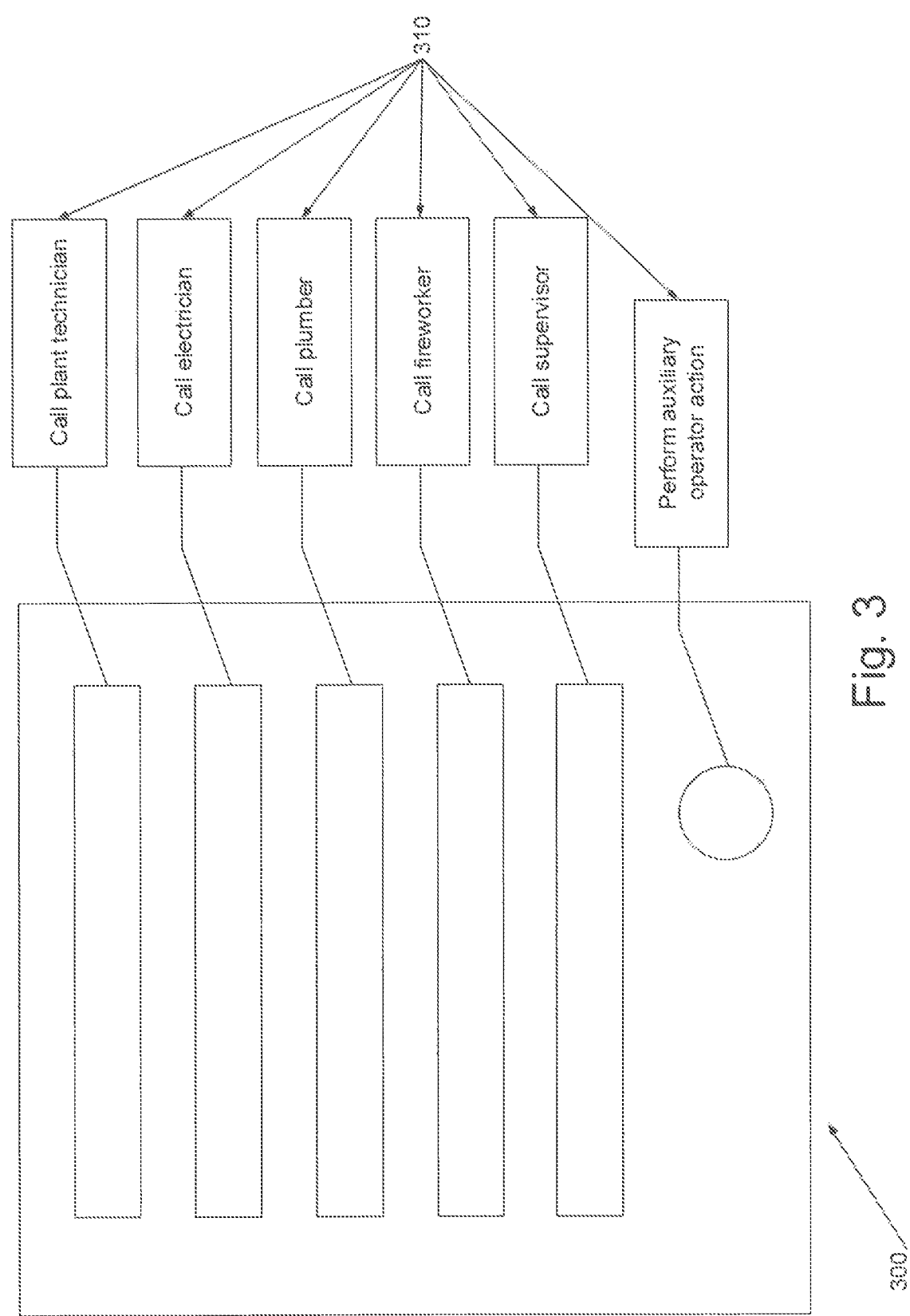
FIG. 3 shows an example of an operator interface allowing the operator to input an auxiliary operator action.

FIG. 3 shows an example of an operator interface 300 allowing the operator to perform an auxiliary operator action. When an operator is performing a training on the tHMI of the workstation, the operator may not always be able to solve a fail scenario by performing actions on the tHMI. Some real life fail scenarios may only be solved by taking action directly on the spray drying plant. This may be done by sending a person to the plant to solve the fail scenario, such as a plant technician or engineer, an electrician, a plumber, a fire worker etc. This may for training purposes be simulated in the tHMI by generating the operator interface 300 allowing e.g. to perform an auxiliary operator action such as calling a plant technician, an electrician, a plumber, a fireworker, or a supervisor of the spray drying plant. The actions that the operator can perform may be simulated in the form of buttons 310 that the operator can press with the mouse of the workstation such that the actions performed by the operator can be tracked and recorded. The operator may e.g. click on the button for simulating the action of calling a plant technician and then confirming by clicking the button for performing the auxiliary operator action.

Figure 4:
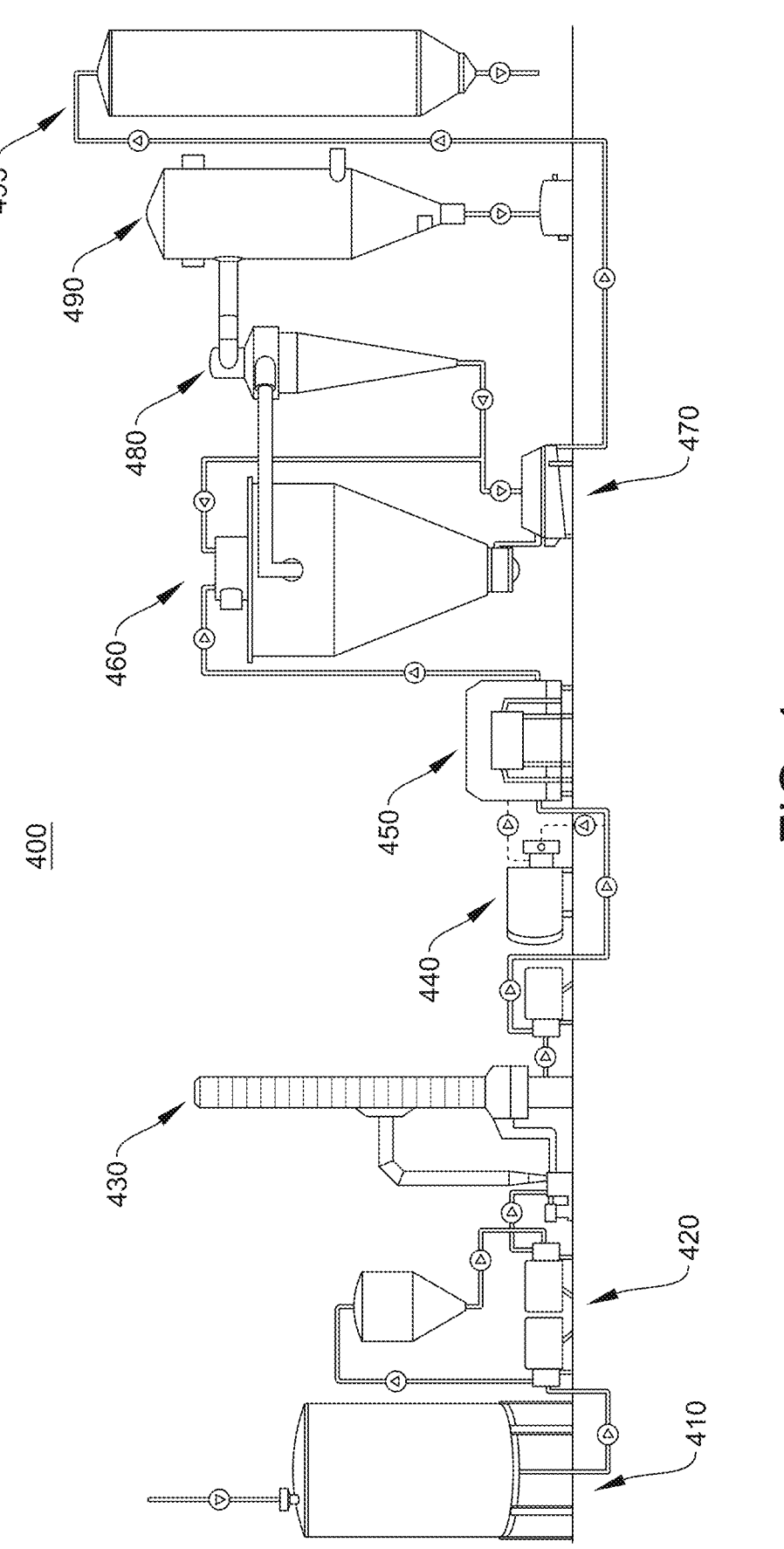
FIG. 4 shows a schematic representation of a spray drying plant, according to an embodiment of the invention.

FIG. 4 shows a schematic representation of a spray drying plant 400 for the spray drying of milk, comprising a milk buffer tank 410, a first centrifugal pump 420, an evaporator 430, a second centrifugal pump 440, a homogenizer 450, a spray dryer 460, a fluid bed 470, a cyclone 480, a bag-filter 490, and a powder silo 495. Here an example of a spray drying process is the spray drying of milk for making powdered milk. The liquid milk is stored in the milk buffer tank 410. Then the milk is first pre-processed for roughly removing the water content of the milk liquid with s first centrifugal pump 420 and a second centrifugal pump 440, an evaporator 430, and a homogenizer 450. Then the concentrated milk is spray dried by being pumped into a spray drying chamber 460, where it is sprayed out through atomizers such as high-pressure nozzles at the same time as a continuous stream of warm drying air is pumped into the chamber. This removes most of the water content from the drops of milk. As it is in most cases it is not possible to prevent the drying air from capturing a minor part of the dry matter content, the air undergoes a post-processing procedure through a cyclone 480 and bag-filter 490. The collected dry matter is then later returned to the process. Nevertheless, the majority of the dry matter content from the milk falls to the bottom of the chamber 460 as powdered milk. The powder is not left lying on the bottom of the chamber, as the bottom is a fluid bed 470. The powdered milk is then stored in the powder silo 495 until the silo is emptied.

Figure 5:
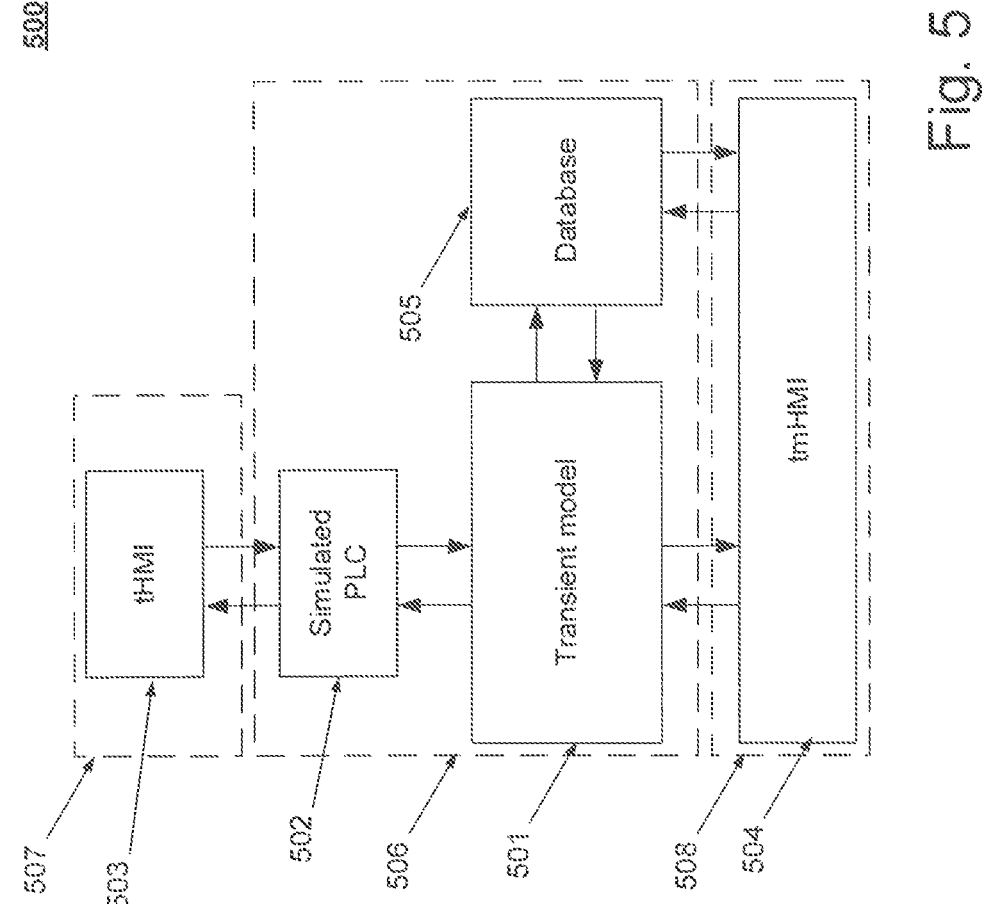
FIG. 5 shows a schematic drawing of a computer system implementing a method for training an operator of a spray drying plant, according to an embodiment of the invention.

FIG. 5 shows a schematic drawing of a computer system 500 implementing a method for training an operator of a spray drying plant, according to an embodiment of the invention. The computer system comprises a number of functional blocks, in particular a transient model functional block 501 simulating a real spray drying plant, a Simulated PLC 502 simulating a PLC of the real spray drying plant, a Database functional block 505 storing a plurality of pre-programmed failure scenarios, a training human machine interface, tHMI, functional block 503 configured to allow an operator to interact with the transient model functional block 501 and see simulated sensor data, and a transient model human machine interface, tmHMI, functional block 504. The tmHMI functional block is configured to allow a trainer to interact with the transient model 501 in order to set initial conditions for the transient model functional block 501 and/or activate pre-programmed failure scenarios stored in the Database functional block 505. By using a Simulated PLC functional block 502, the program code for the oHMI used at the real plant may directly be used for the tHMI, whereby the training may be more realistic. This will furthermore make it easy to change the tHMI if the oHMI is changed, i.e. by simply reusing the new program code of the changed oHMI. The different functional blocks may be implemented in different ways, as an example the Simulated PLC functional block 502, the Transient model functional block 501 and the Database functional block 505 may be implemented on a server 506, the tHMI functional block 503 may be implemented on a first workstation 507, and the tmHMI functional block 504 may be implemented on a second workstation 508. However, the Simulated PLC functional block 502, the Transient model functional block 501 and the Database functional block 505 may also be implemented on two or more servers or all functional blocks could even be implemented in a single workstation.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method for training an operator of a spray drying plant, the method comprising:

providing the spray drying plant comprising a plurality of plant elements including pre-processing elements, a spray drying element, post-processing elements, powder recovery elements, a programmable logic controller, PLC, a plurality of sensors, and a plurality of active elements, wherein the plurality of sensors are configured to measure process variables on the plurality of plant elements and to send sensor signals to the PLC, and wherein the plurality of active elements are configured to control process variables of one or more of the plurality of plant elements in response to control signals received from the PLC, the spray drying plant further comprising an operation human machine interface, oHMI, configured to communicate with the PLC and to display a plurality of sensor data based on obtained sensor signals from the plurality of sensors;

the method comprising the steps of:

obtaining a transient model of the spray drying plant, wherein the transient model comprises transient sub-models of the plurality of plant elements;

calculating repeatedly simulated sensor data based on the obtained transient model, using a processing unit;

displaying on a display a training human machine interface, tHMI, configured to communicate with the transient model of the spray drying plant, and to display the simulated sensor data and control data for the transient model; and updating the transient model based on operator input on the tHMI, for controlling the transient model of the spray drying plant;

wherein the spray drying plant further comprises a workstation with a display, the workstation having an operation mode and a training mode, wherein the workstation is configured to display on the display the oHMI in the operation mode and the tHMI in the training mode, wherein when the workstation is in the training mode, a control unit repeatedly evaluates whether the spray drying plant is in a steady state, and if said control unit determines that the steady state conditions are not fulfilled, the control unit performs an action to switch the workstation from the training mode to the operation mode, wherein the processing unit is configured to set initial condition for the transient model based on real sensor data received from the spray drying plant, such that substantially the same values are displayed on the tHMI and the oHMI and wherein the operator may be trained by switching from the oHMI to the tHMI on the workstation without the operator noticing and subsequently a fail scenario is loaded and started.

2. The method according to claim 1, wherein the transient sub-model for the spray drying chamber is based on one or more inputs and one or more outputs, where the one or more inputs and one or more outputs comprise one or more of the following: the mass flow, the temperature, and the vapor fraction of the air going into the spray drying chamber, or the mass flow, the temperature, and the solids fractions in a product to be dried.

3. The method according to claim 1, wherein the transient sub-model for the spray drying chamber comprises the modelling of at least one of the following: the volume of the spray drying chamber, the heat loss through the surface area of the spray drying chamber, the thickness of the walls of the spray drying chamber, the heat capacity of the walls of the spray drying chamber, the heat transfer coefficient from air to walls, the heat transfer coefficient of the product to be spray dried, the evaporation efficiency of the product to be spray dried, and the fraction of fine particles of the product to be spray dried.

4. The method according to claim 1, wherein at least a portion of the tHMI visual layout is identical to the oHMI.

5. The method according to claim 1, further comprising the steps of:

providing the processing unit with a pre-programmed fail scenario; and modifying the transient model based on the pre-programmed fail scenario using the processing unit.

6. The method according to claim 5, further comprising the steps of:

providing the processing unit with best practice criteria related to a first pre-programmed scenario; and evaluating using the processing unit a performance of the operator based on the best practice criteria.

7. The method according to claim 5, wherein the transient model is configured to communicate with a transient model human machine interface, tmHMI, where the tmHMI is configured to control the transient model by setting initial condition for the transient model and/or activating a particular pre-programmed fail scenario of a plurality of pre-programmed fail scenarios.

8. The method according to claim 1, further comprising the step of:

displaying an operator interface allowing the operator to input auxiliary operator actions.

9. The method according to claim 8, wherein the transient model is further updated based on operator input on the operator interface.

10. The method according to claim 9, wherein the transient sub-models of the plurality of plant elements comprises a first transient sub-model, modelling a first plant element in a first state and wherein the step of updating the transient model based on operator input on the operator interface comprises substituting the first transient sub-model with a second transient sub-model modelling the first plant element in a second state.

11. The method according to claim 8, wherein the operator interface is configured to allow an operator to indicate a plant element of the plurality of plant elements and an auxiliary action.

12. The method according to claim 8, wherein the method further comprises the steps of:

providing the processing unit with a pre-programmed fail scenario, simulating failure of a plant element of the plurality of plant elements;

providing the processing unit with best practice criteria related to the pre-programmed fail scenario;

modifying the transient model based of the pre-programmed fail scenario by substituting a transient sub-model modelling the plant element that is to be failing with another transient sub-model simulating the failure; and evaluating using the processing unit a performance of the operator based on the best practice criteria, wherein the best practice criteria include specific one or more auxiliary operator actions to be performed by the operator using the operator interface.

13. The method according to claim 12, wherein the specific one or more auxiliary actions simulate a maintenance operation or a substitution operation on the failing plant element.

* * * * *